Dec. 21, 1926.

E. E. BRADLEY 1,611,810

WINDING MACHINE

Filed June 3, 1925      2 Sheets-Sheet 1

INVENTOR
Edward E. Bradley
BY
ATTORNEYS

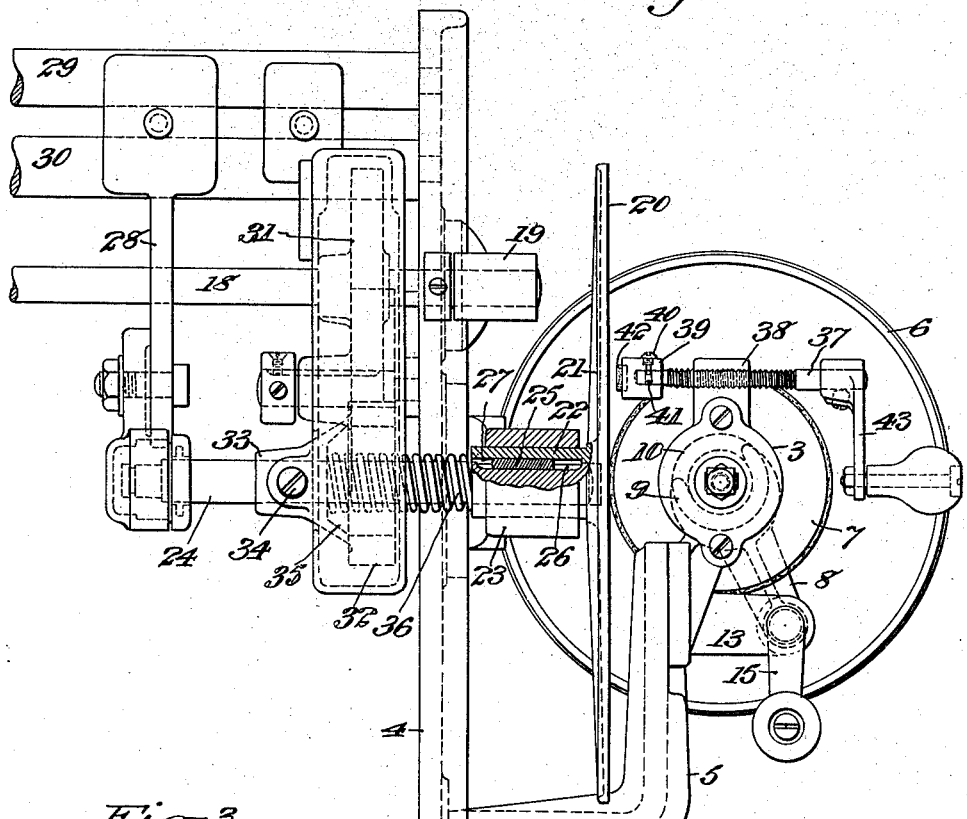

Patented Dec. 21, 1926.

1,611,810

UNITED STATES PATENT OFFICE.

EDWARD E. BRADLEY, OF STONINGTON, CONNECTICUT, ASSIGNOR TO THE ATWOOD MACHINE COMPANY, OF STONINGTON, CONNECTICUT, A CORPORATION OF NEW JERSEY.

WINDING MACHINE.

Application filed June 3, 1925. Serial No. 34,557.

This invention relates to improvements in winding machines and has for its object to provide a means for varying the speed of the winding shafts and devices, without disturbing or changing the speed of the main or common driving mechanism.

Another object is to provide a means for manually controlling the speed of the winding shaft, whereby the rotation of the shaft may be gradually increased to the capacity of the main driving shaft without placing a shock or sudden motion thereon.

A practical embodiment of my invention is represented in the accompanying drawings, in which—

Fig. 2 represents a front elevation of the same, partly in section, and

Fig. 3 represents a similar view in detail with the parts in another position.

Figure 1:
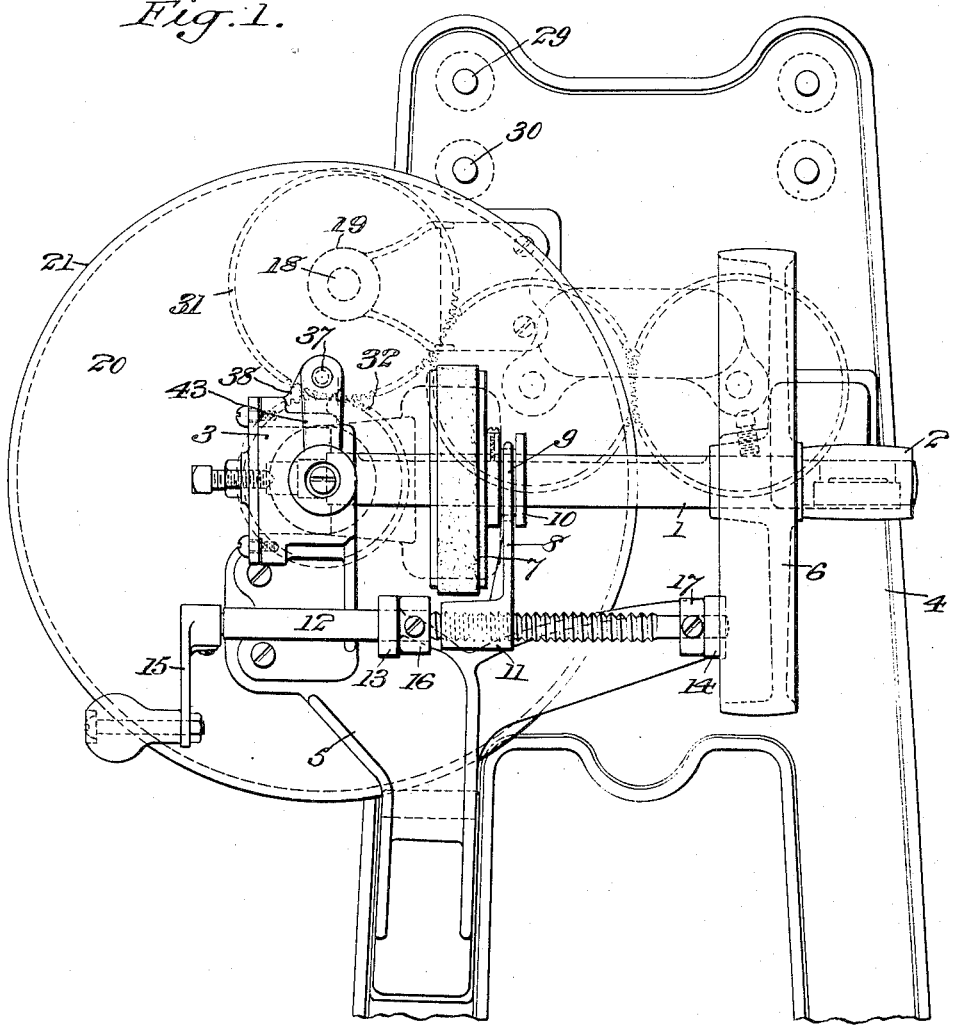
Fig. 1 represents an elevation of so much of a winding machine as will clearly illustrate my invention applied thereto.

The main drive shaft is denoted by 1 and is mounted horizontally in bearings 2, 3, of which the bearing 2 is off set from the end frame 4 of the winding machine, while the bearing 3 is carried by an L-shaped bracket 5 fast on the frame 4.

The shaft 1 is provided with a pulley 6 which receives motion from a source of power (not shown). A friction drive wheel 7 is splined on the shaft 1 and arranged to be moved longitudinally thereon by means of a shifter 8, the outer end of which is forked at 9 to engage a grooved collar 10 carried by the wheel 7. The other end of the shifter is provided with a hub 11 which has a screw threaded engagement with a horizontally arranged shaft 12 which is journaled in bearings 13, 14 extending outwardly from the bracket 5. A crank handle 15 is fixed to the outer end of the shaft 12 and as the shaft is rotated in the bearings 13, 14, the hub 11, of the shifter, by reason of its screw threaded engagement with the shaft 12, will move the forked end 9 and hence the wheel 7 on its shaft 1. The shaft 12 is rotatably held between the bearings 13 and 14 by means of collars 16, 17 fixed on the shaft 12.

The shaft 18 actuates the mechanism (not shown) of the winding machine, and has one end mounted in a bearing 19 carried by the frame 4. Motion is transmitted to the shaft 18 from the main drive shaft 1 through the friction drive wheel 7 contacting with the face 20 of a friction disk 21, which disk 21 is provided with a hub 22 mounted to slide longitudinally and rotated in a bearing 23 extending outwardly from the frame 4. The hub 22 is arranged to receive in slidable engagement, one end of shaft 24, which is held in rotative engagement therewith by a key 25 and grooves 26, 27 in the shaft and hub respectively. The other end of the shaft 24 is adjustably supported in a hanger 28, which depends from cross girts 29, 30 carried by the frame 4 of the winding machine.

A spur gear 31 fast on the shaft 18 meshes with a spur gear 32, the hub 33 of which is secured to the shaft 24 by a set screw 34. This hub 33 is recessed at 35 (Figs. 2 and 3), to receive one end of a coil spring 36 surrounding the shaft 24, while the other end of the spring is arranged to engage the hub 33 of the disk 21 and yieldingly holds the disk in contact with the friction drive wheel 7.

In order to move the disk 21 away from the friction drive wheel 7 and stop the mechanism of the winding machine, I provide a shaft 37 having a screw threaded engagement with a lug 38 uprising from the bearing 3. The end of the shaft 37 adjacent the face 20 of the disk 21 has a buffer or brake shoe 39 secured to rotate on the shaft by means of a set screw 40 screw threaded therein and a groove 41 in the shaft. A button 42 of leather, hard rubber, or other similar material, is inserted in the end of the buffer 39 to yieldingly engage the face 20 of the disk 21. The shaft 37 is rotated by means of a crank handle 43 fast thereon, so as to move the button 42 of the buffer 39 into or out of contact with the face of the disk.

To stop the movement of the shaft 18 of the winding machine, the crank handle 43 is manipulated so as to move the shaft 37 in the lug 38 and the button 42 of the buffer 39 into engagement with the face 20 of the disk 21. This movement slides the disk 21 longitudinally on the shaft 24, compresses the spring 36 against the hub 33 in the recess 35 of the gear 32 and forces the face of the disk away from the friction drive wheel 7, as clearly shown in Fig. 3.

In order to start rotation of the shaft 18 without shock or sudden motion, I am enabled by manipulating the crank handle 43 to gradually bring the face 20 of the disk 21 into contact with the friction drive wheel 7 and so maintain, by the inertia of the spring 36 a sufficient contact therewith until the shaft 18 has transmitted motion to the various parts (not shown) of the winding machine, after which, the buffer 39 may be withdrawn from the face of the disk and the spring allowed to further exert its pressure on the hub 22 and disk 21.

The various speeds which may be transmitted to the disk 21, is controlled and operated by the friction drive wheel 7 on the shaft 1, and its position with respect to the disk, which position is controlled by the manipulation of the crank handle 15, shaft 12 and shifter 8.

It is obvious that various changes may be resorted to in the form, construction and arrangement of the several parts without departing from the spirit and scope of my invention; and hence, I do not intend to be limited to the details herein shown and described except as they may be included in the claims.

What I claim is:—

1. A variable speed driving mechanism for winding machines comprising, a main drive shaft, a friction driving wheel keyed on and mounted to slide longitudinally on said driving shaft, means for moving said driving wheel on the shaft, a winder shaft, a friction driven disk movable longitudinally on said winder shaft, a resilient element disposed on the winder shaft in position to engage said disk for urging the disk into contact with the driving wheel for transmitting motion to the winding machine, and means movable in a right line for engaging the disk to force it away from the driving wheel and to stop the rotation of the disk.

2. A variable speed driving mechanism for winding machines comprising, a main drive shaft, a friction driving wheel keyed on and mounted to slide longitudinally on said driving shaft, means for moving said driving wheel on the shaft, a winder shaft, a friction driven disk movable longitudinally on said winder shaft, a resilient element disposed on the winder shaft in position to engage said disk for urging the disk into contact with the driving wheel for transmitting motion to the winding machine, and manually controlled means movable in a right line for engaging the disk to force it away from the driving wheel and to stop the rotation of the disk.

3. A variable speed driving mechanism for winding machines comprising, a main drive shaft, a friction driving wheel keyed on and mounted to slide longitudinally on said driving shaft, means for moving said driving wheel on the shaft, a winder shaft, a friction driven disk movable longitudinally on said winder shaft, a resilient element disposed on the winder shaft in position to engage said disk for urging the disk into contact with the driving wheel for transmitting motion to the winding machine, and manually controlled means movable in a right line for engaging the disk to force it away from the driving wheel and to stop the rotation of the disk, said means being movable longitudinally toward and away from the face of the disk.

4. A variable speed driving mechanism for winding machines comprising, a main drive shaft, a friction driving wheel keyed on and mounted to slide longitudinally on said driving shaft, means for moving said driving wheel on the shaft, a winder shaft, a friction driven disk movable longitudinally on said winder shaft, a resilient element disposed on the winder shaft in position to engage said disk for urging the disk into contact with the driving wheel for transmitting motion to the winding machine, and manually controlled means movable in a right line for engaging the disk to force it away from the driving wheel and to stop the rotation of the disk, said means being provided with a buffer and movable longitudinally toward and away from the face of the disk.

5. A variable speed driving mechanism for winding machines comprising, a main drive shaft, a friction wheel mounted to slide longitudinally thereon, manually operated means for moving said wheel on the shaft, a winder shaft, a friction disk yieldingly mounted on said shaft and arranged to coact with the wheel for transmitting motion to the winding machine, and manually operated means for moving the disk out of contact with the wheel, said means being provided with a resilient buffer and movable longitudinally toward and away from the disk.

6. A variable speed driving mechanism for winding machines comprising, a main drive shaft, a friction driving wheel keyed on and mounted to slide longitudinally on said driving shaft, means for moving said driving wheel on the shaft, a winder shaft, a friction driven disk movable longitudinally on said winder shaft, a resilient element disposed on the winder shaft in position to engage said disk for urging the disk into contact with the driving wheel for transmitting motion to the winding machine, and manually controlled means movable in a right line for engaging the disk to force it away from the driving wheel and to stop the rotation of the disk, said means having a screw threaded engagement with the machine and arranged to be moved longitudinally toward and away from the face of the disk.

In testimony, that I claim the foregoing as my invention, I have signed my name this first day of June, 1925.

EDWARD E. BRADLEY.